(12) United States Patent
Matsuda

(10) Patent No.: US 7,352,482 B2
(45) Date of Patent: Apr. 1, 2008

(54) APPARATUS AND METHOD FOR PROCESSING DATA AND PRINTING THE SAME, AND RECORDING MEDIUM

(75) Inventor: Hideyuki Matsuda, Hirakata (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 974 days.

(21) Appl. No.: 09/948,044

(22) Filed: Sep. 7, 2001

(65) Prior Publication Data

US 2002/0007448 A1    Jan. 17, 2002

(30) Foreign Application Priority Data

Sep. 7, 2000    (JP)    ............... 2000-271523

(51) Int. Cl.
G06F 3/12    (2006.01)
G06F 15/00    (2006.01)

(52) U.S. Cl. ................ 358/1.15; 358/1.13

(58) Field of Classification Search ........... 358/1.15, 358/1.13, 1.1, 1.2, 1.5, 1.6, 1.9, 1.16, 1.17, 358/1.18, 405, 407, 412, 426.01, 426.03, 358/426.06, 468; 710/20, 21; 709/201; 715/500, 517, 525, 527; 345/502, 505; 382/304; 712/1

See application file for complete search history.

(56) References Cited

U.S. PATENT DOCUMENTS 5,791,790 A * 8/1998 Bender et al. ............ 400/61
5,859,711 A * 1/1999 Barry et al. .............. 358/296
5,933,576 A * 8/1999 Muramatsu .............. 358/1.1
5,970,216 A * 10/1999 Tanio et al. .............. 358/1.13
6,496,504 B1 * 12/2002 Malik .................... 370/390
6,914,697 B2 * 7/2005 Hamura et al. ........... 358/1.17
2003/0038692 A1 * 2/2003 Shimada ................. 358/1.15

FOREIGN PATENT DOCUMENTS

JP    2000-211216    8/2000

OTHER PUBLICATIONS

PostScript Language Document Structuring Conventions Specification, version 3.0, Adobe Developer Support, 1992.*

* cited by examiner

*Primary Examiner*—Dov Popovici
(74) *Attorney, Agent, or Firm*—Buchanan Ingersoll & Rooney PC

(57) ABSTRACT

A data processor has a plurality of data transmitters, a CPU (divider) for dividing print data into a plurality of data segments and I/O controllers for outputting the data segments through at least two in the data transmitters. A printer has a plurality of data transmitters for inputting the data segments to the printer, a CPU (data synthesizer) for synthesizing the data segments inputted to the printer so as to form synthesized data and a printing device for printing the synthesized data. A printing system has the data processor and the printer, which are connected to each other through the data transmitters. The printing system can shorten the time required for transmitting the print data from the data processor to the printer.

12 Claims, 13 Drawing Sheets

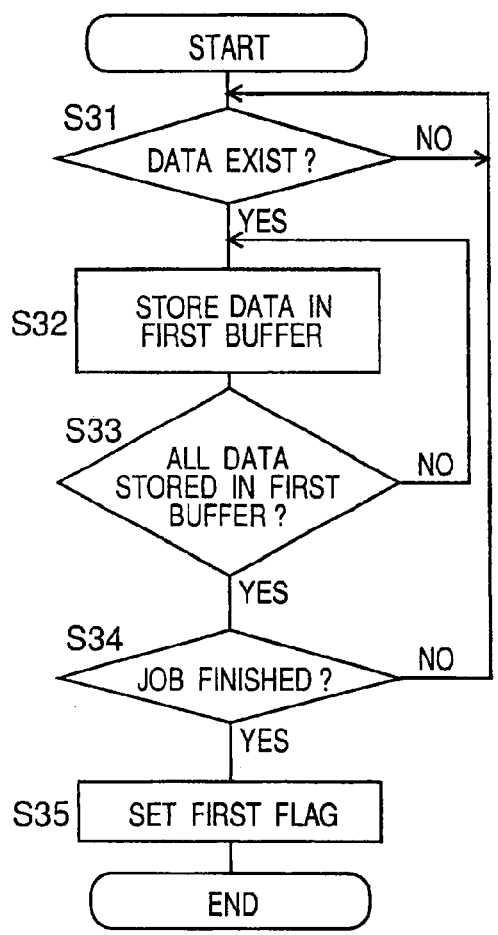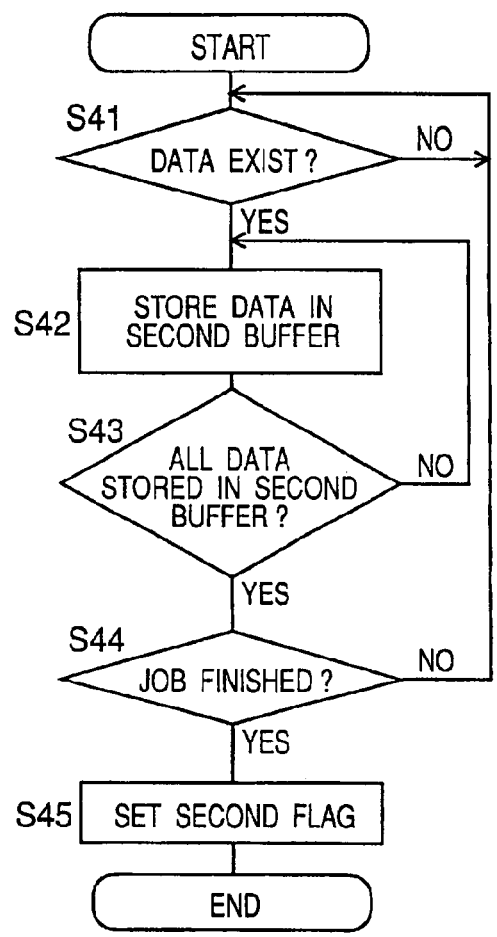

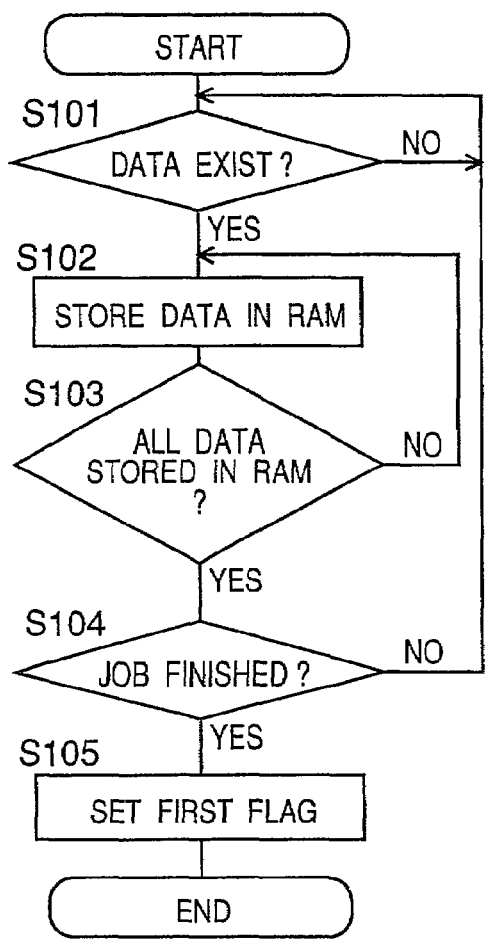 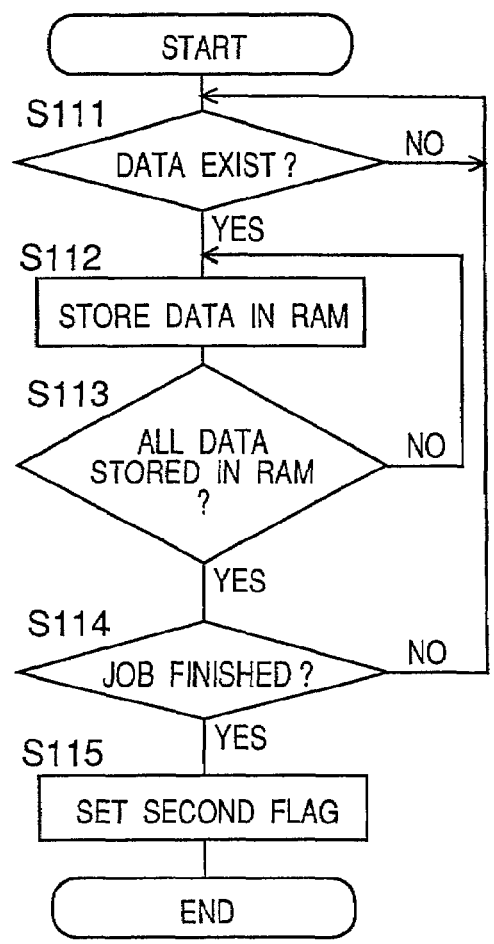

APPARATUS AND METHOD FOR PROCESSING DATA AND PRINTING THE SAME, AND RECORDING MEDIUM

This application is based on the application No. 2000-271523 filed in Japan, the contents of which is hereby incorporated by reference.

BACKGROUND OF THE INVENTION

The present invention relates to a technique for transmitting data among apparatuses connected to one another by means of a plurality of data transmitters. More particularly, it relates to a technique for transmitting print data between a host device and a printer which are connected to each other by means of a plurality of data transmitters.

In recent years, there has appeared a fast data transmitter such as Fast Interface (referred to "I/F" hereinafter) or the like so that a printer is normally equipped with a plurality of I/Fs. In a conventional data transmitting system from a host device to a printer, even if the host device and the printer are connected to each other by means of a plurality of data transmitters such as I/Fs or the like, print data are transmitted through only one data transmitter which has been selected from those.

Although the data are transmitted at high speed using the fast data transmitter such as I/F or the like, the amount of print data to be transmitted is going to increase in response to that the printer is provided with a printing function of high resolution or color printing. Accordingly, it is requested to transmit the data much faster.

SUMMARY OF THE INVENTION

The present invention, which has been developed to respond to the above-mentioned request, provides a printing system including a data processor and a printer, a method of processing data and a printing method, each of which can shorten time required for transmitting the data by transmitting the data using a plurality of data transmitters when the data is transmitted from a host device to a printer. Hereupon, "time required for transmitting the data" means such a time as required to transmit the data from a device for sending the data to a device for receiving the data through the data transmitters.

A data processor according to the present invention, which has been developed to solve the problems of the prior art described above, is characterized in that it includes a plurality of data transmitters, a data divider for dividing data into a plurality of data segments, and an output controller for outputting the data segments to at least two data transmitters in the plurality of data transmitters.

In the data processor, the data divider may divide the data by every page (i.e. by page unit), or divide the data into the data segments having predetermined sizes. Meanwhile, the data divider may divide the data by every page, and then add information for identifying page to each of the data segments divided by every page. Alternatively, the data divider may divide the data by every printing paper (i.e. by printing paper unit), and then add information for identifying printing paper to each of the data segments divided by every printing paper.

In the data processor, each of the data transmitters may be a data transmitting device according to any one of standards of Parallel Interface, USB, IEEE 1394 and RS-232C. Hereupon, Parallel Interface includes, for example, Centronics Interface, IEEE 1284 or the like.

A printer according to the present invention is characterized in that it includes a plurality of data transmitters for inputting data segments to the printer, a data synthesizer for synthesizing the data segments inputted to the printer so as to form synthesized data, and a printing device for printing the synthesized data. In the printer, each of the data transmitters may be a data transmitting device according to any one of standards of Parallel Interface, USB, IEEE 1394 and RS-232C.

A printing system according to present invention is characterized in that it includes the above-mentioned data processor and the above-mentioned printer, wherein the data transmitters in the data processors are connected to the data transmitters in the printer. In the printing system, each of the data transmitters may be a data transmitting device according to any one of standards of Parallel Interface, USB, IEEE 1394 and RS-232C.

A method of processing data according to the present invention is characterized in that it includes the steps of, dividing the data into a plurality of data segments, outputting the data segments to at least two data transmitters, and letting the data transmitters transmit the data segments.

A printing method according to the present invention is characterized in that it includes the steps of, inputting a plurality of data segments to a printer through a plurality of data transmitters, synthesizing the data segments inputted to the printer so as to form synthesized data, and printing the synthesized data.

According to the present invention, there is provided a recording medium which records a program which can be read by a computer, the program letting the computer execute the steps of dividing data into a plurality of data segments, outputting the data segments to at least two data transmitters, and letting the data transmitters transmit the data segments.

Further, according to the present invention, there is provided another recording medium which records a program, which can be read by a computer, the program letting the computer execute the steps of inputting a plurality of data segments to a printer through a plurality of data transmitters, synthesizing the data segments inputted to the printer so as to form synthesized data, and printing the synthesized data.

BRIEF DESCRIPTION OF THE DRAWINGS

The present invention will become more apparent from the following description with reference to the accompanying drawings, and in which:

FIGS. 3A and 3B are flowcharts showing a program executed by I/O controllers in the printer;

FIGS. 11A and 11B are flowcharts showing another program executed by the I/O controllers in the printer;

DETAILED DESCRIPTION OF THE PREFERRED EMBODIMENTS

Construction of a Printing System

Hereinafter, a printing system according to the present invention will be described with reference to the accompanying drawings.

Figure 1:
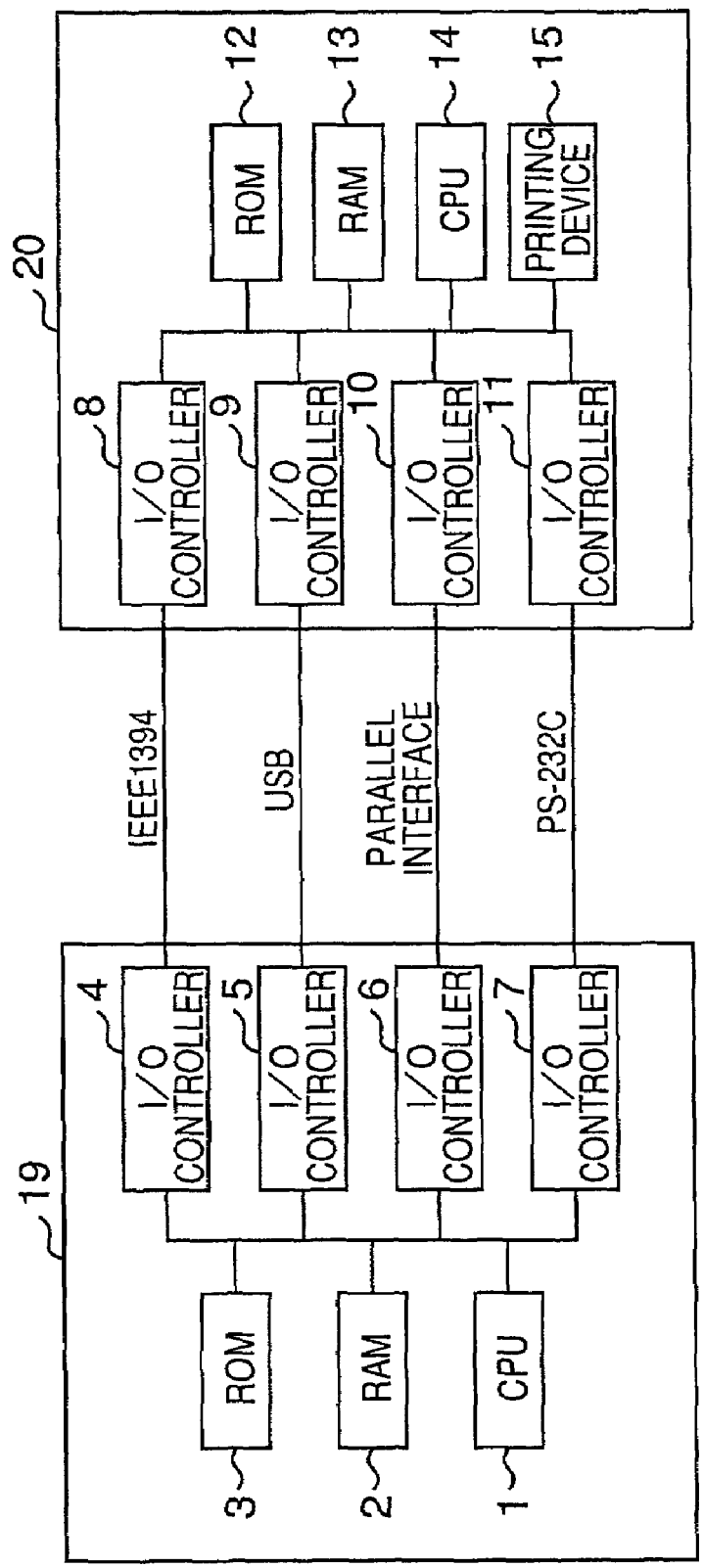
FIG. 1 is a block diagram showing a rough construction of a printing system provided with a data processor and a printer.

FIG. 1 is a block diagram showing a rough construction of a printing system provided with a data processor 19 and a printer 20. The data processor 19 is a kind of computer such as a PC (personal computer) or the like. The data processor 19 includes a CPU 1, a RAM 2, a ROM 3, and four I/O controllers 4, 5, 6 and 7. The CPU 1 is connected to the RAM 2 which temporally stores print data and programs executed to control the data processor 19 by the CPU 1, the ROM 3 which stores programs for controlling the data processor 19, and the I/O controllers 4, 5, 6 and 7 which control operations for inputting and outputting the print data. The printer 20 includes four I/O controllers 8, 9, 10 and 11, a ROM 12, a RAM 13, a CPU 14 and a printing device 15. Similar to the data processor 19, as to the printer 20 also, the CPU 14 is connected to the I/O controllers 8, 9, 10 and 11 which control operations for inputting and outputting the print data, the ROM 12 which stores programs for controlling the printer 20, the RAM 13 which temporally stores the print data and programs executed to control the printer 20 by the CPU 14, and the printing device 15. The data processor 19 and the printer 20 are connected to each other through a plurality of data transmitter (Parallel Interface, USB, IEEE 1394, RS-232C or the like).

Hereupon, the print data means data for performing printing operations, which may be character data or image data. Each of the data processor 19 and the printer 20 must be provided with I/O controllers of the number same as the number of the data transmitters connected to those.

In the printing system according to the present embodiments, programs for processing the print data are stored in the ROM 3 while programs for performing the printing operation is stored in the ROM 12. Alternatively, the above-mentioned programs may be wholly or partially stored in a medium for recording information (not shown) such as a floppy disk, hard disk, CD-ROM or the like. In this case, the programs and data may be read out of the medium for recording information as occasion demands to be sent to the RAM 2 or 13 so that the programs may be executed. Further, in the printing system according to the present embodiments, each of the CPUs 1 and 14 executes the programs or processing operations by turns, in accordance with the user's operation.

Hereinafter, there will be described three methods for transmitting the data between the data processor 19 and the printer 20 in the present printing system. In the first method, the print data are divided into a plurality of data segments by every page to be transmitted. In the second method, the print data are divided into a plurality of data segments having predetermined sizes to be transmitted. In the third method, after the print data have been divided into a plurality of data segments by every page, each of the data segments is provided with information for identifying page to be transmitted. Further, in a variation of the third method, after the print data have been divided into a plurality of data segments by every printing paper, each of the data segments is provided with information for identifying printing paper to be transmitted. Although Parallel Interface, USB, IEEE 1394, RS-232C or the like may be used as the data transmitters, the data transmitters are not limited to those. Any devices, which can transmit the data from the data processor 19 to the printer 20, may be used. The data processor 19 and the printer 20 may be connected to each other through a network such as LAN or the like. Hereinafter, there will be described such cases that USB and IEEE 1394 are used as the data transmitters. Because this is merely to simplify the description, the data transmitters are not of course limited to USB and IEEE 1394.

In such a case that the pages of the print data are smaller in number, the data may be transmitted faster using only IEEE 1394 whose transmission rate is relatively higher in comparison with the case that the print data are divided to be transmitted using two data transmitters of IEEE 1394 and USB. In this case, the print data should not be of course divided so that the print data should be transmitted using one data transmitter whose transmission rate is the fastest (IEEE 1394 in this embodiment). Hereinafter, there will be described such a case that the pages of the print data are relatively larger in number. In this case, the print data may be transmitted faster by dividing the print data and transmitting the divided data using a plurality of data transmitters, in comparison with the case that the print data are not divided and transmitted using only one data transmitter.

The First Method

Hereinafter, there will be described the first method for transmitting the data between the data processor 19 and the printer 20. At first, operations of the CPU 1 in the data processor 19 will be described.

Figure 2:
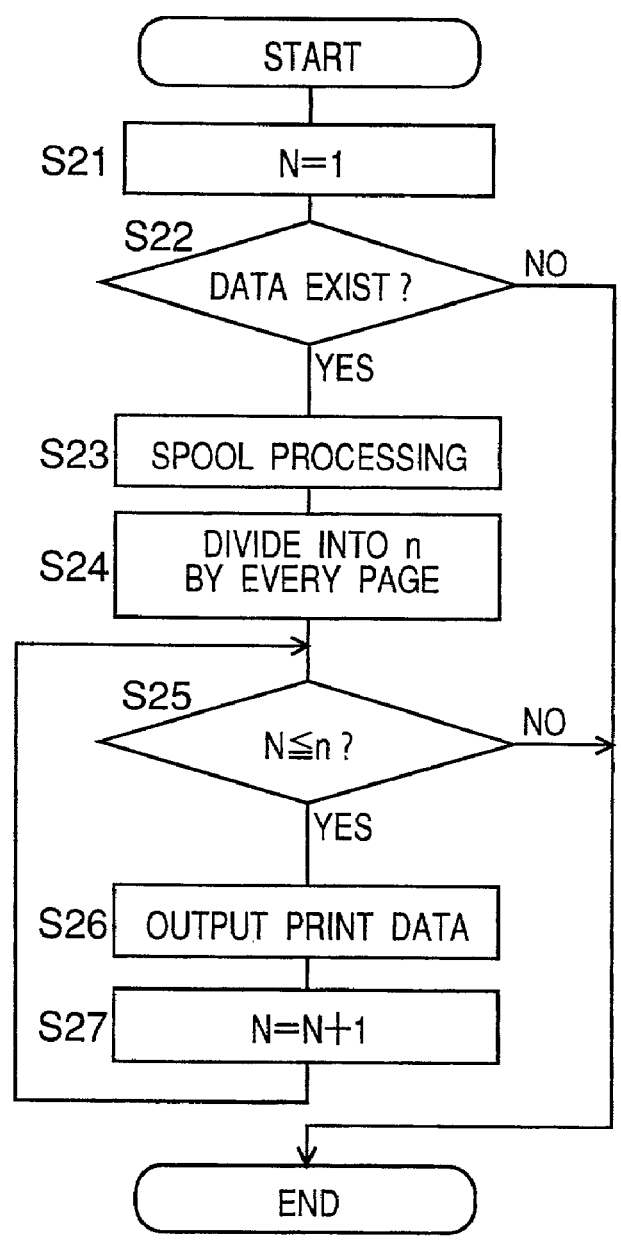
FIG. 2 is a flowchart showing a program for processing print data.

FIG. 2 is a flowchart of a program for processing the print data, which is executed by the CPU 1 in the data processor 19. After the program has been started, initialization processing is performed at first (Step S21), wherein for example N is set to one (N=1). Next, it is judged whether the print data exist or not (Step S22). Step S23 is executed if the print data exist, while this program for processing the print data is finished if the print data do not exist. Following that, spool processing is performed (Step S23). The spool processing is such an operation to express the print data in the page description language.

Then the print data are divided into n data segments (n=2, in this embodiment) by every page (Step S24). The existing IEEE 1394 has the transmission rate of 100 Mbps, 200 Mbps or 400 Mbps, while the existing USB has the transmission rate of 1.5 Mbps or 12 Mbps. Thus, in this embodiment, it is supposed that the transmission rate of IEEE 1394 is 100 Mbps, while the transmission rate of USB is 12 Mbps. Accordingly, the ratio of the transmission rate of IEEE 1394 to that of USB is 25/3 (25:3). It is preferable that the print data are divided by a ratio that is possibly nearer to the above-mentioned ratio. For example, if the number of the pages of the print data is twenty-eight in all, the data are divided into a data segment of twenty-five pages and a data segment of three pages.

Hereinafter, in the two data transmitters, the transmitter whose transmission rate is faster is referred to the first data transmitter, while the transmitter whose transmission rate is slower is referred to the second data transmitter. Further, to the head of each of the divided data segments, there are added data indicating the number of the total pages and data indicating the priority grade in order of the volume of the pages. Hereupon, an example of the data having a higher priority grade is data having a smaller page number.

Then the number N of the data transmitter used at present is compared with the division number n of the print data to judge whether N≦n is right (i.e. YES) or not (Step S25). Step S26 is executed if N≦n is right (YES), while this program for processing the print data is finished if N≦n is not right (NO). In Step S26, the data segment having the highest priority grade, which has not been transmitted yet, is outputted to one of the I/O controllers 4 and 5. At this time, the data segment is outputted to one of the I/O controllers 4 and 5 in such a manner that the data transmitter, whose transmission rate is the fastest in the unused data transmitters, is used. After that, the I/O controller 4 or 5 transmits the data segment to the printer 20 using the data transmitter. Next, N is increased by one (N=N+1, Step S27), and then the processing operation is put back to Step S25. After Steps S26 and S27 have been repeatedly executed till N comes up to n in Step S25, this program for processing the print data is finished.

Figure 4:
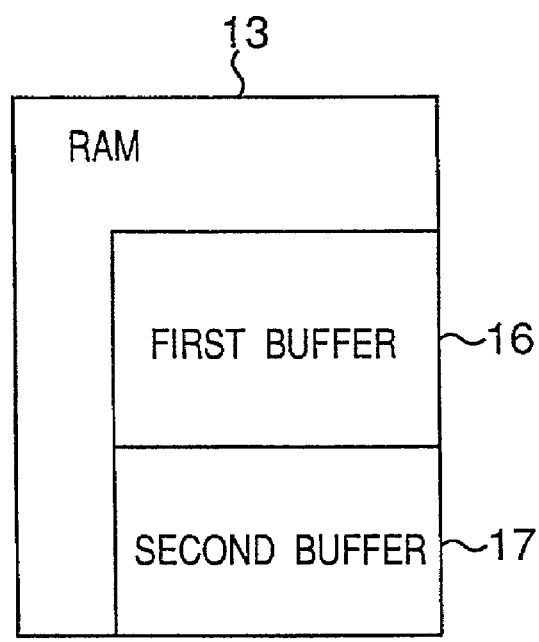
FIG. 4 is a schematic view showing a RAM region.

Hereinafter, operations of the I/O controllers 8, 9, 10 and 11 in the printer 20 will be described. FIG. 3A is a flowchart showing a program executed by the I/O controller 8. After the program has been started, at first, the I/O controller 8 judges whether the print data (data segment) have been transmitted from the data processor 19 to the printer 20 or not (Step S31). Step S32 is executed if the print data have been transmitted, while Step S31 is repeatedly executed till the print data have been transmitted if the print data have not been transmitted yet. In Step S32, the print data are stored in a first buffer 16 (see FIG. 4) of the RAM 13. At this time, the print data expressed in the page description language may be stored in the first buffer 16 as image data. As shown in FIG. 4, in the RAM 13, the first buffer 16 is a RAM region distinguished from a second buffer 17.

Then it is judged whether all of the print data have been stored in the first buffer 16 or not (Step S33). This is because it is probable that all of the print data are not completely stored in the first buffer 16 when the volume of the print data is very large. Step S34 is executed if all of the print data have been stored in the first buffer 16, while the processing operation is put back to Step S32 if all of the print data have not been stored in the first buffer 16. Because the print data are outputted from the first buffer 16 when the print data in the first buffer 16 are printed, free spaces are formed in the first buffer 16. In consequence, the remaining print data can be stored in the first buffer 16 by the operation in Step S32.

Next, it is judged whether the whole pages of data segment of the print data have been transmitted to be stored in the first buffer 16 or not while referring to the header in the data segment. That is, it is judged whether the job has been finished or not (Step S34). If the job has not been finished yet, the processing operation is put back to Step S31 to process the remaining print data. If the job has been finished, a first flag for indicating the completion of the job is set (Step S35), and then the execution of the program is finished.

FIG. 3B is a flowchart showing a program executed by the I/O controller 9. After the program has been started, at first, the I/O controller 9 judges whether the print data (data segment) have been transmitted from the data processor 19 to the printer 20 or not (Step S41). Step S42 is executed if the print data have been transmitted, while Step S41 is repeatedly executed till the print data have been transmitted if the print data have not been transmitted yet. In Step S42, the print data are stored in the second buffer 17 (see FIG. 4) of the RAM 13. At this time, the print data expressed in the page description language may be stored in the second buffer 17 as image data.

Then it is judged whether all of the print data have been stored in the second buffer 17 or not (Step S43). This is because it is probable that all of the print data are not completely stored in the second buffer 17 when the volume of the print data is very large. Step S44 is executed if all of the print data have been stored in the second buffer 17, while the processing operation is put back to S42 if all of the print data have not been stored in the second buffer 17. Because the print data are outputted from the second buffer 17 when the print data in the second buffer 17 are printed, free spaces are formed in the second buffer 17. In consequence, the remaining print data can be stored in the second buffer 17 by the operation in Step S42.

Next, it is judged whether the whole pages of the data segment of the print data have been transmitted to be stored in the second buffer 17 or not while referring to the header in the data segment. That is, it is judged whether the job has been finished or not (Step S44). If the job has not been finished yet, the processing operation is put back to Step S41 to process the remaining print data. If the job has been finished, a second flag for indicating the completion of the job is set (Step S45), and then the execution of the program is finished.

Figure 5:
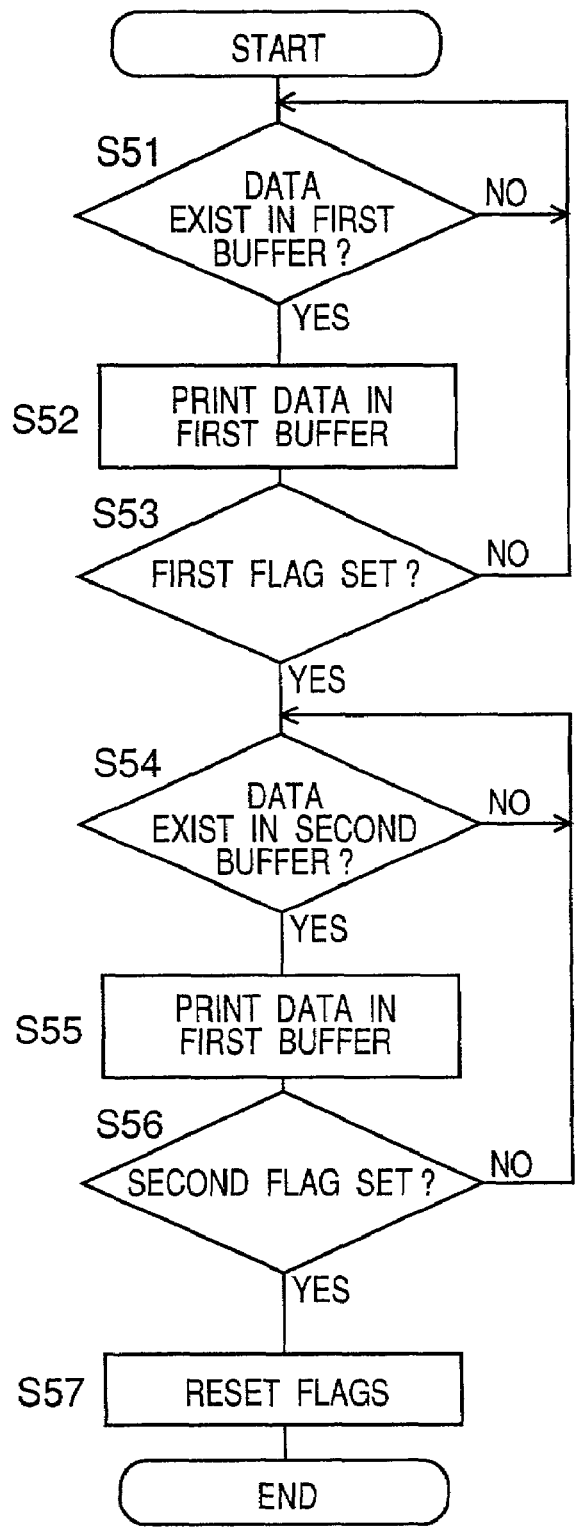
FIG. 5 is a flowchart showing a program executed by a CPU in the printer.

Hereinafter, operations of the CPU 14 in the printer 20 will be described. FIG. 5 is a flowchart showing a program executed by the CPU 14 in the printer 20. After the program has been started, at first, it is judged whether the print data exist in the first buffer 16 or not (Step S51). If the print data do not exist in the first buffer 16, Step 51 is repeatedly executed till the print data have been stored in the first buffer 16. If the print data exist in the first buffer 16, the print data are printed by controlling the printing section 15 (Step S52). Next, it is judged whether the first flag is set or not (Step S53). If the first flag is not set, the processing operation is put back to Step S51. On the other hand, if the first flag is set, it is judged whether the print data exist in the second buffer 17 or not (Step S54). If the print data do not exist in the second buffer 17, Step 54 is executed again. If the print data exist in the second buffer 17, the print data are printed by controlling the printing device 15 (Step S55). Next, it is judged whether the second flag is set or not (Step S56). If the second flag is not set, the processing operation is put back to Step S54. On the other hand, if the second flag is set, the first flag and the second flag are reset (Step S57), and then the execution of the program is finished.

The printing system using the first method divides the print data into a plurality of data segments, and then transmits the data segments from the data processor 19 to the printer 20 while simultaneously using a plurality of data transmitters which are usable, as described above. In consequence, according to the printing system, time required for transmitting the data may be shortened.

The Second Method

Hereinafter, there will be described the second method for transmitting the data between the data processor 19 and the printer 20. At first, operations of the CPU 1 in the data processor 19 will be described.

Figure 6:
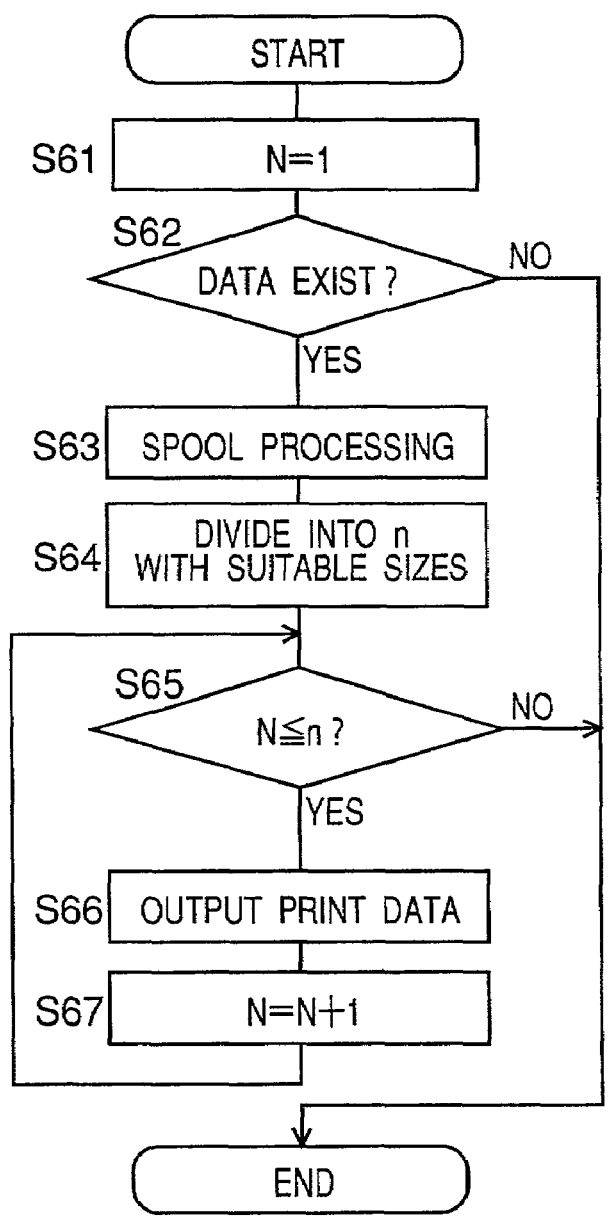
FIG. 6 is a flowchart showing another program for processing the print data.

FIG. 6 is a flowchart of a program for processing the print data, which is executed by the CPU 1 in the data processor 19. After the program has been started, initialization processing is performed at first (Step S61), wherein for example N is set to one (N=1). Next, it is judged whether the print data exist or not (Step S62). Step S63 is executed if the print data exist, while this program for processing the print data is finished if the print data do not exist. Following that, spool processing is performed (Step S63). The spool processing is such an operation to express the print data in the page description language.

Then the print data are divided into n (n=2, in this example) data segments having suitable sizes (Step S64). In this embodiment, it is supposed that the transmission rate of IEEE 1394 is 100 Mbps while the transmission rate of USB is 12 Mbps. Accordingly, the ratio of the transmission rate of IEEE 1394 to that of USB is 25/3. It is preferable that the print data are divided by a ratio that is possibly nearer to the above-mentioned ratio. For example, if the number of the pages of the print data is twenty-eight in all, the print data are divided into a data segment of twenty-five pages and a data segment of three pages. Hereinafter, in the two data transmitters, the transmitter whose transmission rate is faster is referred to the first data transmitter, while the transmitter whose transmission rate is slower is referred to the second data transmitter. Further, to the head of the data segment, there are added data indicating the number of the total pages and data indicating the priority grade in order of the volume of the pages. Hereupon, an example of the data having a higher priority grade is data having a smaller page number.

Then the number N of the data transmitter used at present is compared with the division number n of the print data to judge whether N≦n is right or not (Step S65). Step S66 is executed if N≦n is right (YES), while this program for processing the print data is finished if N≦n is not right (NO). In Step S66, the data segment having the highest priority grade, which has not been transmitted yet, is outputted to one of the I/O controllers 4 and 5. At this time, the data segment is outputted to one of the I/O controllers 4 and 5 in such a manner that the data transmitter, whose transmission rate is the fastest in the unused data transmitters, is used. After that, the I/O controller 4 or 5 transmits the data segment to the printer 20 using the data transmitter. Next, N is increased by one (N=N+1, Step S67), and then the processing operation is back to Step S65. After Steps S66 and S67 have been repeatedly executed till N comes up to n in Step S65, this program for processing the print data is finished.

Operations of the I/O controllers 8, 9, 10 and 11 in the printer 20 according to the second method are as same as those according to the first method. Therefore, a detailed description as to the operations of the I/O controllers 8, 9, 10 and 11 is omitted in order to avoid duplicated descriptions.

Figure 7:
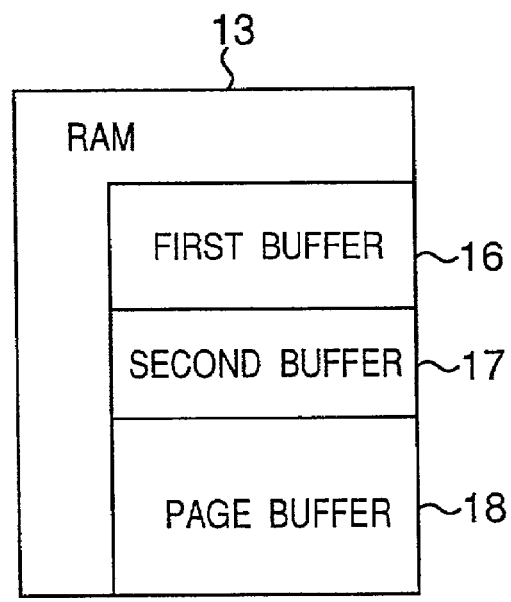
FIG. 7 is a schematic view showing another RAM region.

Hereinafter, operations of the CPU 14 in the printer 20 will be described. FIG. 7 is a schematic view showing the rough construction of the RAM region in the RAM 13. The RAM region of the RAM 13 is divided into a first buffer 16, a second buffer 17 and a page buffer 18. In the first buffer 16, the print data transmitted through the first data transmitter are stored. In the second buffer 17, the print data transmitted through the second data transmitter are stored.

Figure 8:
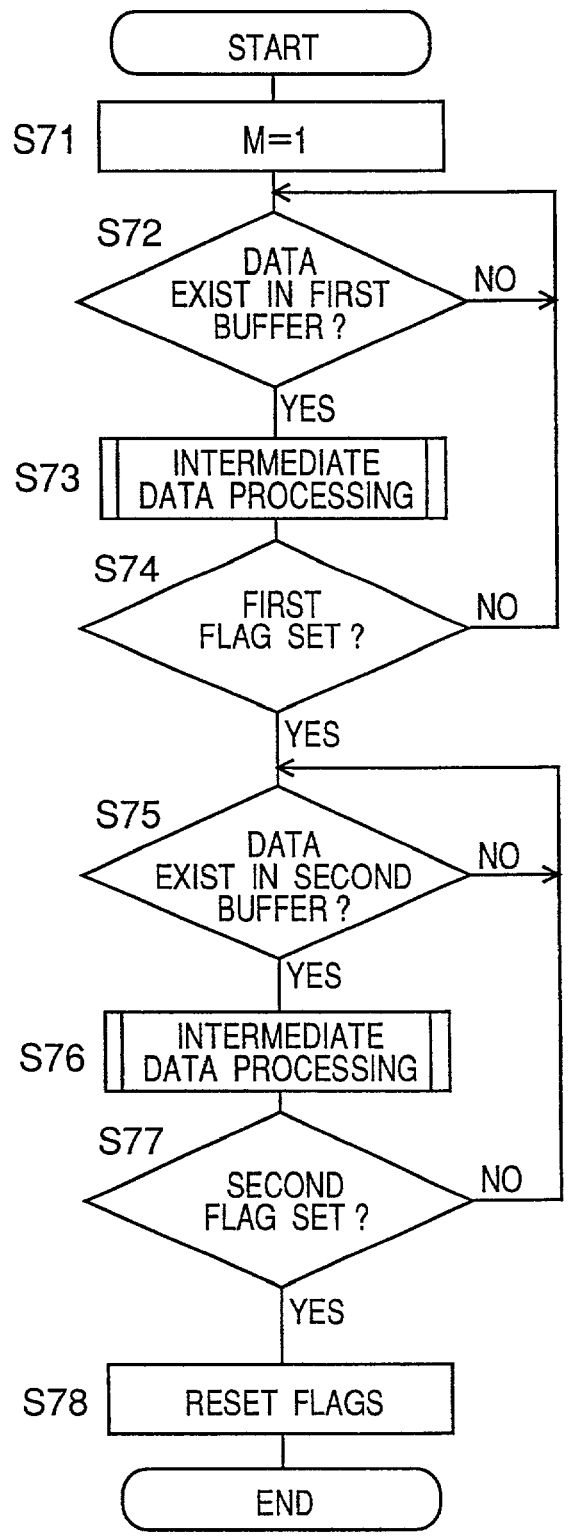
FIG. 8 is a flowchart showing a main routine program of the program executed by the CPU in the printer.

FIG. 8 is a flowchart showing the main routine program of a program executed by the CPU 14 in the printer 20. After the program has been started, initialization processing is performed (Step S71), wherein M is set to one (M=1). Next, it is judged whether the print data (data segment) exist in the first buffer 16 or not (Step S72). If the print data do not exist in the first buffer 16, Step S72 is repeatedly executed till the print data have been stored in the first buffer 16. If the print data exist in the first buffer 16, intermediate data processing is executed (Step S73). Following that, it is judged whether the first flag is set or not (Step S74). If the first flag is not set, the processing operation is put back to Step S72. On the other hand, if the first flag is set, it is judged whether the print data exist in the second buffer 17 or not (Step S75). If the print data do not exist in the second buffer 17, Step S75 is executed again till the print data have been stored in the second buffer 17. If the print data exist in the second buffer 17, the intermediate data processing is executed (Step S76). The procedure of the intermediate data processing (Step S73 or S76) will be described in detail below. Next, it is judged whether the second flag is set or not (Step S77). If the second flag is not set, the processing operation is put back to Step S75. On the other hand, if the second flag is set, the first flag and the second flag are reset (Step S78), and then the execution of the program is finished.

Hereinafter, the intermediate data processing (Step S73 or S76) will be described.

Figure 9:
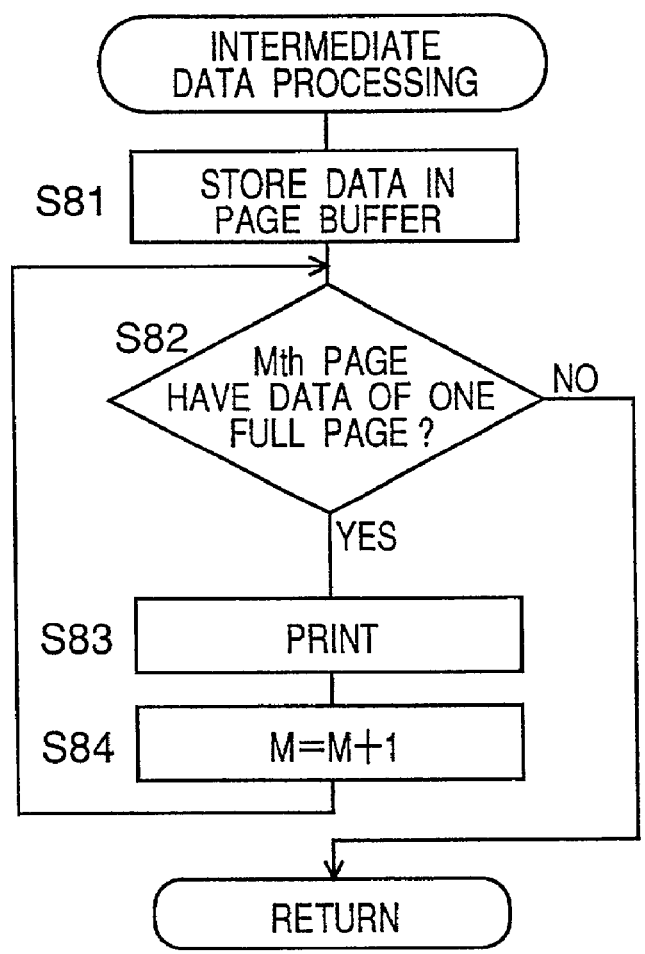
FIG. 9 is a flowchart showing a subroutine program of the program executed by the CPU in the printer.

FIG. 9 is a flowchart showing a subroutine program of the program executed by the CPU 14 in the printer 20. In the subroutine program, at first, the print data existing in the first buffer 16 (or the second buffer 17) are stored in the page buffer 18 (Step S81). At this time, in the page buffer 18, the print data, which have been previously stored and do not completely fill one page, are synthesized with the print data, which are newly stored and do not completely fill one page, thereby producing print data which completely fill one page. Hereupon, the print data expressed in the page description language may be stored in the page buffer 18 as image data. Next, it is judged whether the print data of the Mth page have data volume of one full page (Step S82). If the print data do not have data volume of one full page, the operation is put back to Step S73 or S76 in FIG. 8. On the other hand, if the print data have data volume of one full page, the print data of the Mth page are printed by controlling the printing section 15 (Step S83). Next, M is increased by one (M=M+1, Step S84), and then Step S82 is executed.

The printing system using the second method divides the print data into a plurality of data segments, and then transmits the data segments from the data processor 19 to the printer 20 while simultaneously using a plurality of data transmitters which are usable, as described above. In consequence, according to the printing system, time required for transmitting the data may be shortened when the amount of the data is smaller.

The Third Method

Hereinafter, there will be described the third method for transmitting the data between the data processor 19 and the printer 20. At first, operations of the CPU 1 in the data processor 19 will be described.

Figure 10:
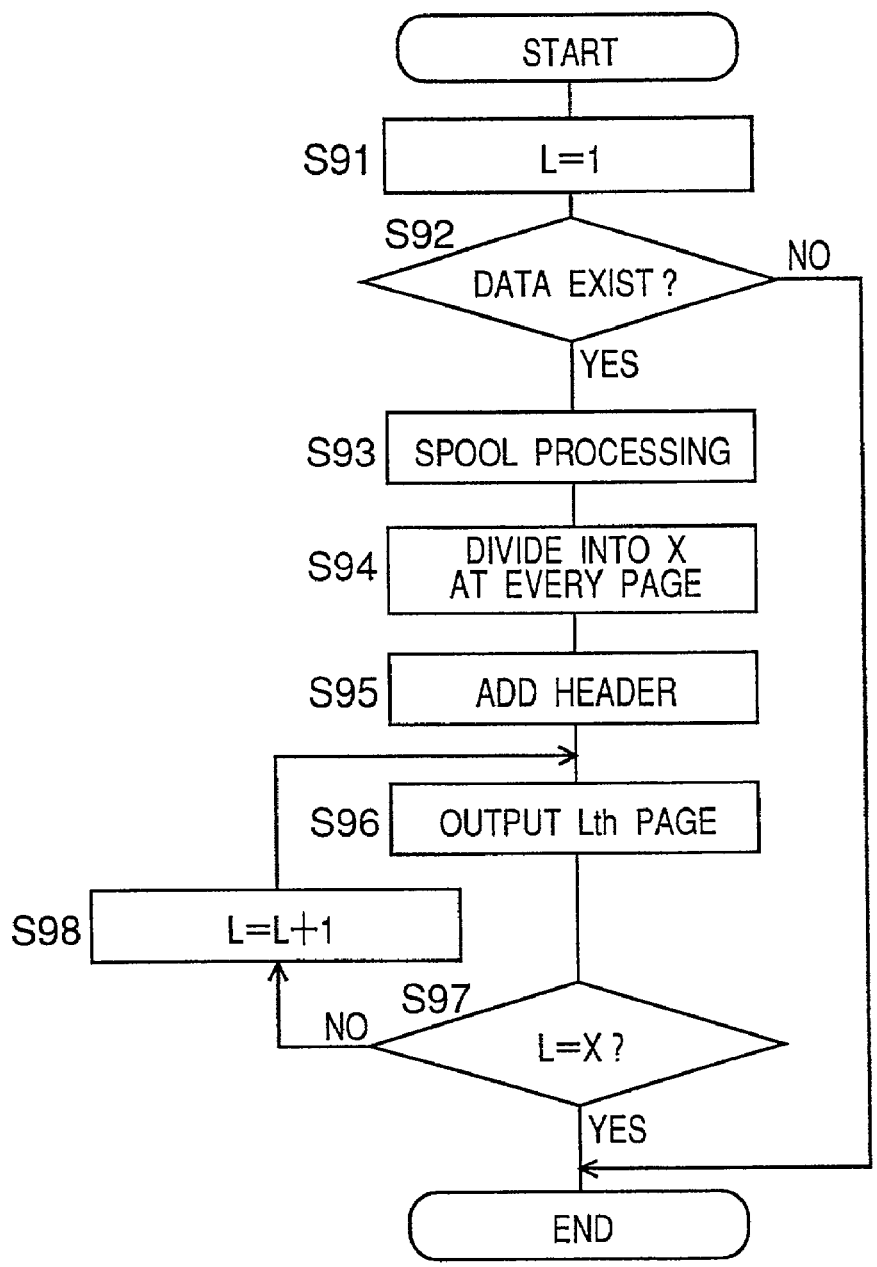
FIG. 10 is a flowchart showing a further program for processing the print data.

FIG. 10 is a flowchart of a program for processing the print data, which is executed by the CPU 1 in the data processor 19. After the program has been started, initialization processing is performed at first (Step S91), wherein for example L is set to one (L=1). Next, it is judged whether the print data to be printed are stored in the RAM 2 or not (Step S92). Step S93 is executed if the print data exist, while this program for processing the print data is finished if the print data do not exist. Following that, spool processing is performed (Step S93). The spool processing is such an operation to express the print data in the page description language.

Then the print data are divided into a plurality of data segments by every page (Step S94). For example, the print data having the data volume of X pages in all are divided into X data segments (X≧1). Further, to the head of each of the data segments, there is added a header indicating the page number of the segment and the number of the total pages (Step S95). Next, the data segment of the Lth page, which has the smallest page number in the data segments that have not been transmitted yet, is outputted to any one of the I/O controllers 4, 5, 6 and 7 (Step S96). At this time, the data segment is outputted to any one of the I/O controllers 4, 5, 6 and 7 in such a manner that the data transmitter, whose transmission rate is the fastest in the unused data transmitters, is used. After that, the I/O controller 4, 5, 6 or 7 transmits the data segment to the printer 20 using the data transmitter. Next, it is judged whether L is equal to X (L=X) or not (Step S97). If L is equal to X, the execution of this program for processing the print data is finished. On the other hand, if L is not equal to X, L is increased by one (L=L+1, Step S98), and then the operation is put back to Step S96.

Alternatively, in Step S94, instead of dividing the print data into X data segments by every page, the print data may be divided into X data segments by every printing paper and then each of the data segments may be compressed to print data having the volume of one page. Hereupon, when the print data of n pages are reduced to 1/n and then printed as print data of one page, "by every printing paper" means print data of n pages. Although it is preferable that the value of n is set to 1, 2, 4, 8 or 16, the value is not limited to those. In this case also, to the head of each of the data segments, there is added a header indicating the page number of the segment and the number of the total pages (Step S95). If Steps S94 and S95 are changed as described above, the print data can be transmitted in such a manner that the print data of n pages are printed in one sheet of printing paper.

Figure 12:
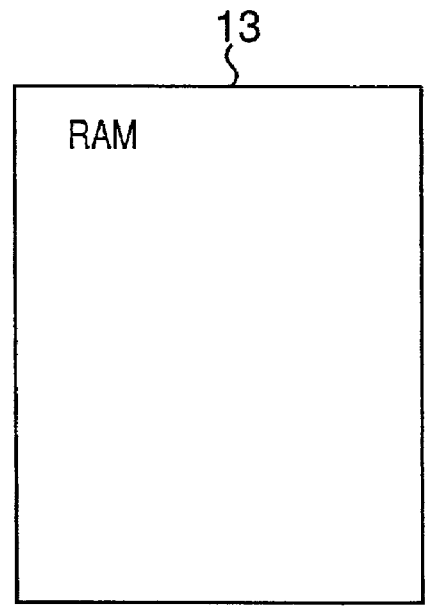
FIG. 12 is a schematic view showing another RAM region.

Hereinafter, operations of the I/O controllers 8, 9, 10 and 11 in the printer 20 will be described. FIG. 11A is a flowchart showing a program executed by the I/O controller 8. After the program has been started, at first, the I/O controller 8 judges whether the print data (data segment) have been transmitted from the data processor 19 to the printer 20 or not (Step S101). Step S102 is executed if the print data have been transmitted, while Step S101 is repeatedly executed till the print data have been transmitted if the print data have not been transmitted yet. In Step S102, the print data are stored in the RAM 13 (see FIG. 12).

Then it is judged whether all of the print data have been stored in the RAM 13 or not (Step S103). This is because it is probable that all of the print data are not completely stored in the RAM 13 when the volume of the print data is very large. Step S104 is executed if all of the print data have been stored in the RAM 13, while the operation is put back to Step S102 if all of the print data have not been stored in the RAM 13. Because the print data are outputted from the RAM 13 when the print data in the RAM 13 are printed, free spaces are formed in the RAM 13. In consequence, the remaining print data can be stored in the RAM 13 by the operation in Step S102.

Next, it is judged whether the whole pages of the data segments (print data) have been transmitted to be stored in the RAM 13 or not while referring to the header in the print data. That is, it is judged whether the job has been finished or not (Step S104). If the job has not been finished yet, the operation is put back to Step S101 to process the remaining print data. If the job has been finished, a first flag for indicating the completion of the job is set (Step S105), and then the execution of the program is finished.

FIG. 11B is a flowchart showing a program executed by the I/O controller 9. After the program has been started, at first, the I/O controller 9 judges whether the print data (data segment) have been transmitted from the data processor 19 to the printer 20 or not (Step S111). Step S112 is executed if the print data have been transmitted, while Step S111 is repeatedly executed till the print data have been transmitted if the print data have not been transmitted yet. In Step S112, the print data are stored in the RAM 13 (see FIG. 12).

Then it is judged whether all of the print data have been stored in the RAM 13 or not (Step S113). This is because it is probable that all of the print data are not completely stored in the RAM 13 when the volume of the print data is very large. Step S114 is executed if all of the print data have been stored in the RAM 13, while the operation is put back to Step S112 if all of the print data have not been stored in the RAM 13. Because the print data are outputted from the RAM 13 when the print data in the RAM 13 are printed, free spaces are formed in the RAM 13. In consequence, the remaining print data can be stored in the RAM 13 by the operation in Step S112.

Next, it is judged whether the whole pages of the data segments (print data) have been transmitted to be stored in the RAM 13 or not while referring to the header in the print data. That is, it is judged whether the job has been finished or not (Step S114). If the job has not been finished yet, the operation is put back to Step S111 to process the remaining print data. If the job has been finished, a second flag for indicating the completion of the job is set (Step S115), and then the execution of the program is finished.

Figure 13:
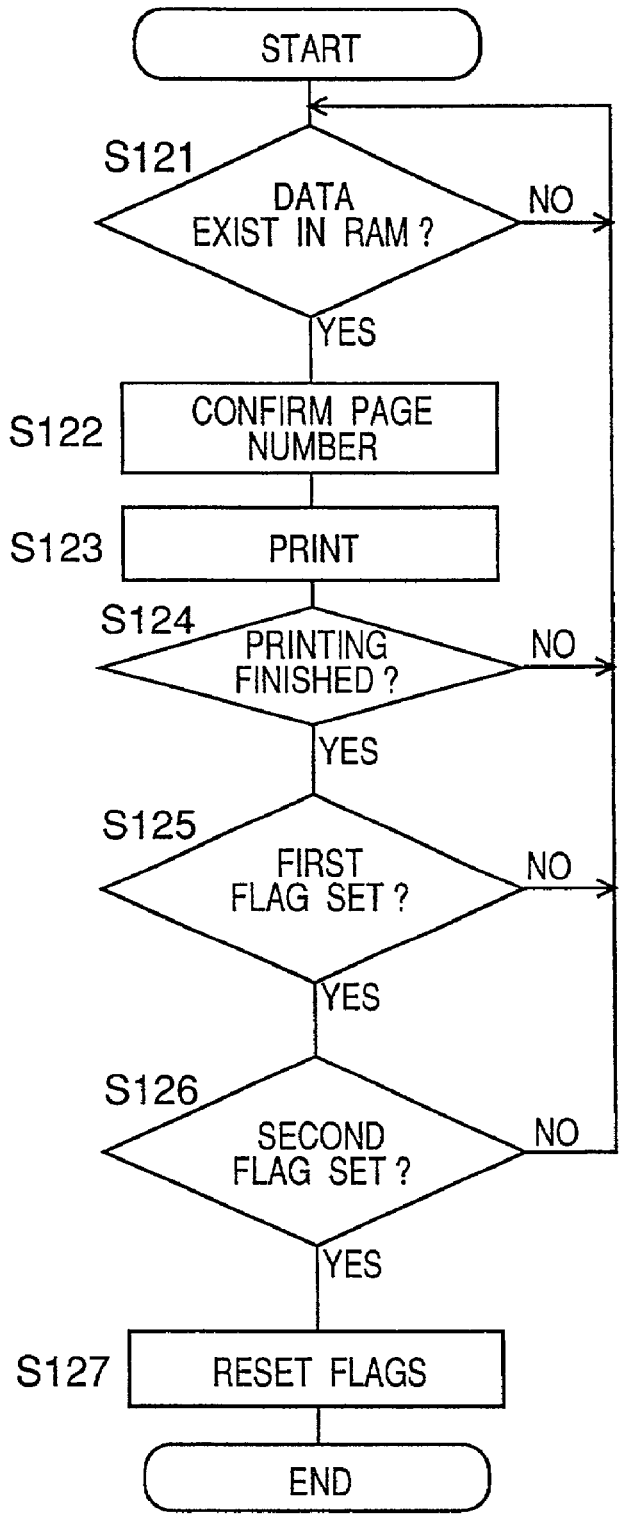
FIG. 13 is a flowchart showing another program executed by the CPU in the printer.

Hereinafter, operations of the CPU 14 in the printer 20 will be described. FIG. 13 is a flowchart showing a program executed by the CPU 14 in the printer 20. After the program has been started, at first, it is judged whether the print data exist in the RAM 13 or not (Step S121). If the print data do not exist, Step S121 is repeatedly executed till the print data have been stored in the RAM 13. If the print data exist, the page number in the header is confirmed (Step S122). Then the print data are read out of the RAM 13 by turns in order of increasing the page number from the print data having the smallest page number. Following that, the read print data are printed by controlling the printing section 15 (Step S123).

Next, it is judged whether all of the print data have been printed or not on the basis of the header of the print data that have been printed (Step S124). If all of the print data have not been printed yet, the operation is put back to Step S121. On the other hand, if all of the print data have been printed, it is judged whether the first flag is set or not (Step S125). If the first flag is not set, the operation is put back to Step S121. On the other hand, if the first flag is set, Step S126 is executed. In step S126, it is judged whether the second flag is set or not. If the second flag is not set, the operation is put back to Step S121. On the other hand, if the second flag is set, the first flag and the second flag are reset (Step S127), and then the execution of the program is finished.

The printing system using the third method divides the print data into a plurality of data segments by every page, and then transmits the data segments from the data processor 19 to the printer 20 while simultaneously using a plurality of data transmitters which are usable, as described above. In consequence, according to the printing system, time required for transmitting the data may be shortened.

Although the above-mentioned embodiments are described as to such cases that the data are transmitted from the data processor 19 to the printer 20, the present invention is not limited to such cases. If a plurality of data transmitters are used, time required for transmitting the data may be shortened, for example, in the case that the data are transmitted between PCs also. Meanwhile, in the above-mentioned embodiments, IEEE 1394 and USB are used as the data transmitters. However, other transmitters such as Parallel Interface, RS-232C or the like may be used. Further, the print data segments may be transmitted using three or more data transmitters.

Although the present invention is described above taking specific embodiments as examples, it will be understood by those skilled in the art that the present invention is not limited to these embodiments, but covers all modifications which are within the scope and spirit of the present invention as defined by the appended claims.

What is claimed is:

1. A data processor comprising:
a plurality of data outputs wherein each of the plurality of data outputs has a transmission speed associated therewith;
a processor for processing image data;
a data divider for dividing said processed image data into a plurality of data segments; and
an output controller for outputting said data segments to at least two of said data outputs wherein the data segments are distributed among the data outputs in relation to a ratio of their respective transmission speeds;
wherein said data divider divides said processed image data into a plurality of data segments by every page.

2. The data processor according to claim 1, wherein said data divider adds information for identifying said page of each of said data segments.

3. The data processor according to claim 1, wherein said data divider divides said said processed image data by print data of n pages.

4. The data processor according to claim 2, wherein said data divider adds information for identifying the number n of total pages.

5. The data processor according to claim 1, wherein the processor compresses the data segments to print data of n pages in one sheet of printing paper.

6. The data processor according to claim 1 wherein at least two of the plurality of data outputs have different standards.

7. The data processor according to claim 1, wherein said data divider adds identifying information to each of said data segments.

8. The data processor according to claim 1, wherein each of said data outputs conforms to a standard selected from a group consisting of paralleled interface, USB, IEEE 1394 and RS-232C.

9. A printing system, comprising:
a data processor provided with a plurality of data outputs wherein each of the plurality of data outputs has a transmission speed associated therewith, a data divider for dividing data into a plurality of data segments and an output controller for outputting said data segments to at least two of said data outputs wherein the data segments are distributed among the data outputs in relation to a ratio of their respective transmission speeds; and
a printer provided with a plurality of data inputs for receiving said data segments, a data synthesizer for synthesizing said data segments so as to form synthesized data and a printing device for printing said synthesized data, wherein said data outputs in said data processor are connected to said data inputs in said printer.

10. The printing system according to claim 9, wherein each of said data outputs conforms to a standard selected from a group consisting of Parallel Interface, USB, IEEE 1394 and RS-232C.

11. A method of processing data comprising the steps of:
processing image data;
dividing said processed image data into a plurality of data segments;
outputting said data segments to at least two data outputs wherein the at least two data outputs have transmission speeds associated therewith and the data segments are output among the at least two data outputs in relation to a ratio of their respective transmission speeds; and
letting said data outputs transmit said data segments.

12. A computer readable medium storing a computer program encoded with instructions capable of being executed by a computer, said computer program instructing said computer to execute the steps of, processing image data, dividing said processed image data into a plurality of data segments, and outputting said data segments to at least two data outputs wherein the at least two data outputs have transmission speeds associated therewith and the data segments are output among the at least two data outputs in relation to a ratio of their respective transmission speeds and letting said data outputs transmit said data segments.

* * * * *

UNITED STATES PATENT AND TRADEMARK OFFICE
CERTIFICATE OF CORRECTION

PATENT NO. : 7,352,482 B2  Page 1 of 1
APPLICATION NO. : 09/948044
DATED : April 1, 2008
INVENTOR(S) : Hideyuki Matsuda It is certified that error appears in the above-identified patent and that said Letters Patent is hereby corrected as shown below:

Claim 4, Column 11, Line 31: change "said" to --the--.

Claim 8, Column 11, Line 44: change "paralleled" to --parallel--.

Signed and Sealed this

Nineteenth Day of August, 2008

JON W. DUDAS
*Director of the United States Patent and Trademark Office*